Figure 1:
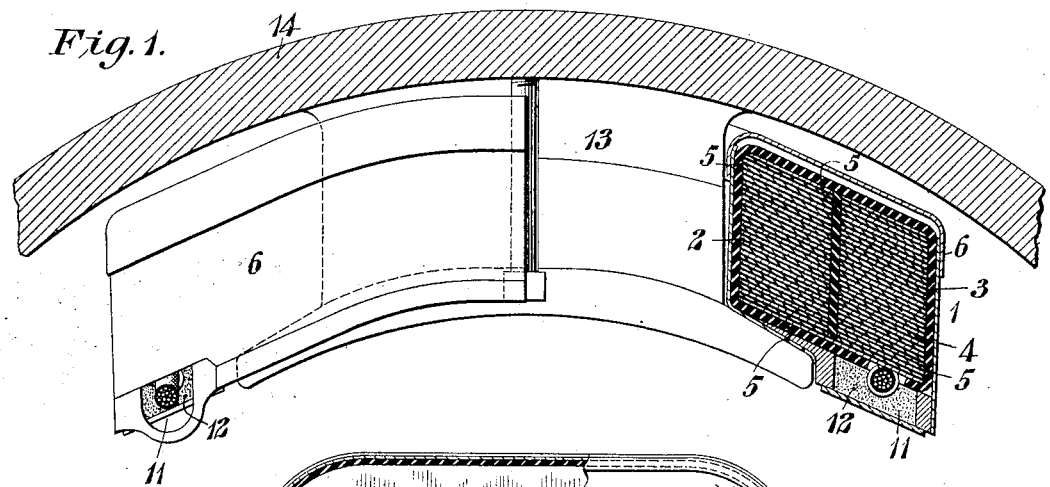

No. 747,631. PATENTED DEC. 22, 1903.
L. A. OSBORNE.
FIELD MAGNET COIL FOR ELECTRICAL MACHINES.
APPLICATION FILED JUNE 24, 1903.
NO MODEL. 2 SHEETS—SHEET 1.

WITNESSES:
C. L. Belcher
J. C. Morse

INVENTOR
Loyall A. Osborne
BY
Wesley G. Carr
ATTORNEY.

No. 747,631. PATENTED DEC. 22, 1903.
L. A. OSBORNE.
FIELD MAGNET COIL FOR ELECTRICAL MACHINES.
APPLICATION FILED JUNE 24, 1903.
NO MODEL. 2 SHEETS—SHEET 2.
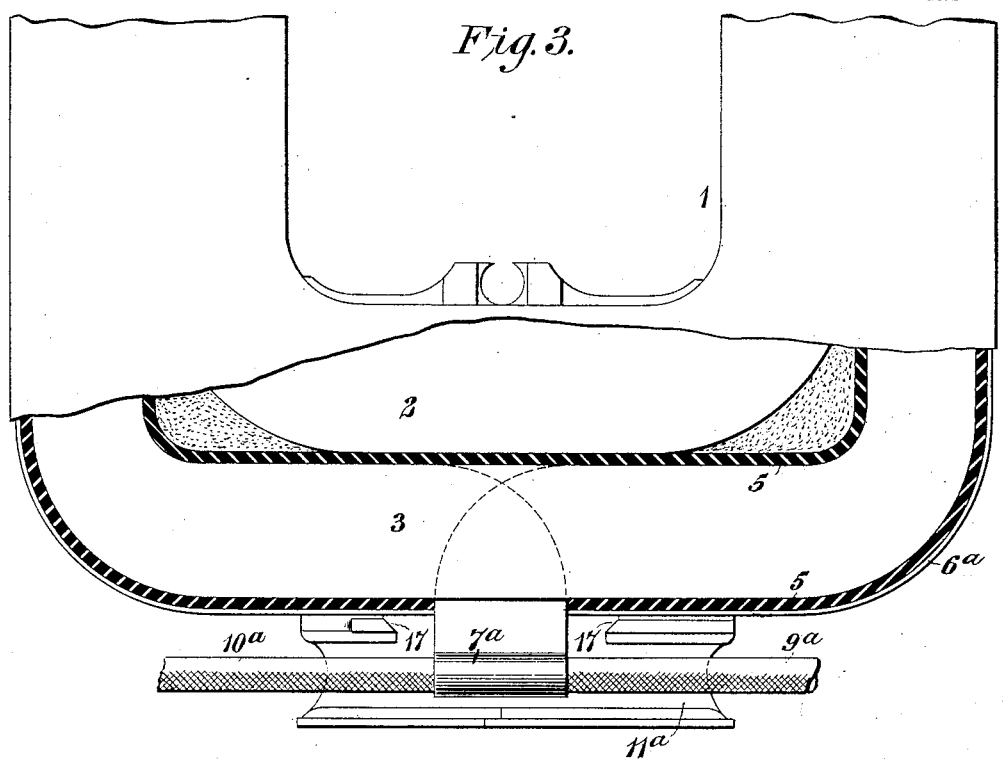
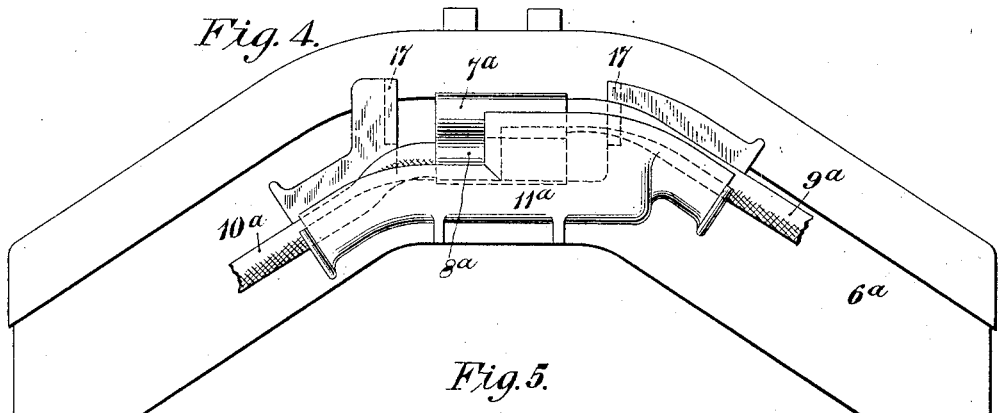
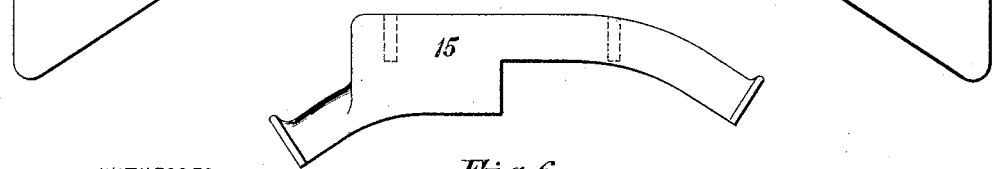
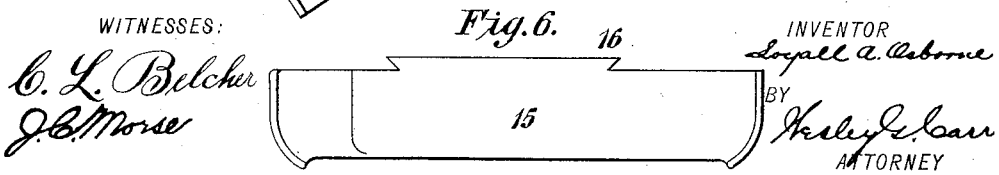
WITNESSES:
C. L. Belcher
J. C. Morse
INVENTOR
Loyall A. Osborne
BY
Wesley G. Carr
ATTORNEY No. 747,631. Patented December 22, 1903.

UNITED STATES PATENT OFFICE.

LOYALL A. OSBORNE, OF PITTSBURG, PENNSYLVANIA, ASSIGNOR TO WESTINGHOUSE ELECTRIC & MANUFACTURING COMPANY, A CORPORATION OF PENNSYLVANIA.

FIELD-MAGNET COIL FOR ELECTRICAL MACHINES.

SPECIFICATION forming part of Letters Patent No. 747,631, dated December 22, 1903.

Application filed June 24, 1903. Serial No. 162,907. (No model.)

*To all whom it may concern:*

Be it known that I, LOYALL A. OSBORNE, a citizen of the United States, and a resident of Pittsburg, in the county of Allegheny and State of Pennsylvania, have invented a new and useful Improvement in Field-Magnet Coils for Electrical Machines, of which the following is a specification.

My invention relates to the field-magnets of electrical machines, and particularly to means for insulating and protecting the coils of such field-magnets.

The object of my invention is to provide field-magnet coils with such insulating and protecting means as shall effectively prevent any breaking down of the structure by reason of heat and which shall also exclude moisture from the coil and prevent mechanical injury thereof.

My invention is primarily intended for use in connection with motors utilized for propelling railway-vehicles; but it is susceptible of use in other relations, and any illustration or description which may be specific to railway-motor construction is not intended to limit the invention to such machines, but merely to set forth one specific means of utilizing the same.

It is well known that conductors which are utilized to carry heavy currents are heated by such currents and that such heat can be effectively dissipated only by the circulation around and between the coils or turns of the coils of currents of cooling fluid.

In the case of certain machines—such, for example, as railway-motors—it is generally impracticable to provide a circulation of air or liquid to keep down the temperature on account of the practical necessity of inclosing the windings in order to protect them from moisture and other atmospheric conditions. It is to such electrical machines that my invention is specially applicable, and in order to keep down the temperature as much as possible I prefer to form the coils of strap-copper, thus insuring a maximum cross-section of conductor in a given space, and thus minimize the resistance. The strap-copper may be bent either flatwise or edgewise; but as certain advantages are to be found in the edgewise construction I have illustrated this in the drawings.

My invention is illustrated in the accompanying drawings, in which—

Figure 2:
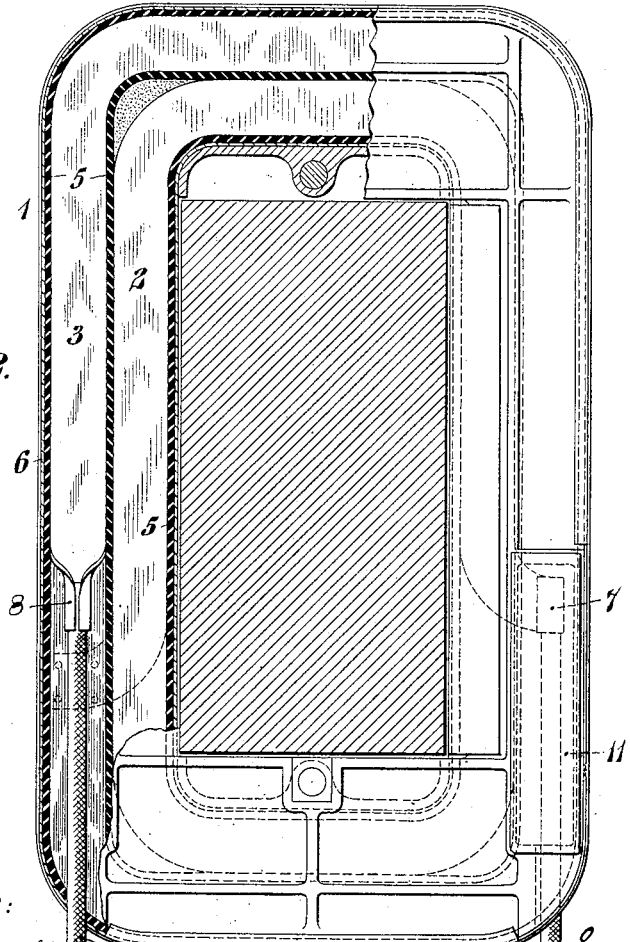

Figure 1 is a view, partially in end elevation and partially in section, of a portion of a field-magnet, showing one pole-piece and a coil mounted thereon. Fig. 2 is a view, partially in bottom plan and partially in section, of the coil shown in Fig. 1. Fig. 3 is a view, partially in plan and partially in section, of a portion of a coil having a modified form of casing. Fig. 4 is an end elevation of the coil shown in Fig. 3, and Figs. 5 and 6 are detail views of a part of the casing shown in Figs. 3 and 4.

Referring now particularly to Figs. 1 and 2, the coil 1 is formed of a strap conductor wound on edge in two separate and approximately concentric sections 2 and 3, which are connected together to operate as a single coil. It is to be understood that any number of concentric coils may be employed and that the strap conductors may be wound flatwise instead of edgewise, if desired. Between adjacent turns of each coil are placed strips 4 of shellacked asbestos or other heat-resisting insulating material, and the coils are baked under heavy pressure after being thus built up. Between and around the coil-sections 2 and 3 are placed sheets 5 of built-up mica or other suitable non-combustible insulating material of the proper thickness, these partitions and sheaths being formed of as many parts as the size and form of the coils may require. The entire coil thus built up and insulated is inclosed in a metal shell 6 and is tightly wedged therein by means of mica and asbestos. The joints of the various parts of shell 6 are soldered or otherwise so sealed as to be moisture-proof.

The ends 7 and 8 of the coil-sections 2 and 3 are respectively bent around the ends of the leads 9 and 10, and the latter extend outward through suitable chambers 11, which are otherwise filled with suitable insulating and moisture-excluding material 12. The complete coil is mounted upon a pole-piece 13, constituting part of a field-magnet frame 14, which may be formed of either cast-iron or steel.

Although the coil shown in the drawings is designed for a railway-motor field-magnet, it is to be understood that the same construction may be adopted in any type of field-magnet coil without departing from my invention.

In the form of coil and casing shown in Figs. 3 to 6 the ends $7^a$ and $8^a$ of the coil project from the body of the casing $6^a$ at the middle of one end and are attached to the corresponding leads $9^a$ and $10^a$ within a terminal-box $11^a$, the cover 15 of which is anchored to the body part by means of a dovetail projection 16, the edges of which engage corresponding undercut portions 17 of the body part.

It is seen from the drawings and the foregoing description that the peculiar insulation precludes any possibility of roasting or burning out of the coils, that moisture is effectively excluded by a hermetically-sealed shell, and that said shell also provides superior protection from mechanical injury.

I claim as my invention—

1. A field-magnet coil for electrical machines formed of strap-copper and sheets of heat-resisting insulation between adjacent turns, in combination with a hermetically-sealed shell in which said coil is inclosed.

2. In an electrical machine, a field-magnet coil having adjacent turns separated by heat-resisting, insulating material and formed in two sections each of which is surrounded by sheets of heat-resisting, insulating material and a hermetically-sealed metal casing in which said coil is inclosed.

3. A field-magnet coil for electrical machines, comprising two concentric sections each formed of edgewise-bent, copper-strap, sheets of insulating and heat-resisting material between adjacent turns, shells of insulating and heat-resisting material surrounding the two sections of the coil and a hermetically-sealed metal shell in which said coil is inclosed.

4. A coil for electrical machines comprising a plurality of parts, insulating, heat-resisting material surrounding and separating said parts and a hermetically-sealed metal shell in which said coil is inclosed.

5. A field-magnet coil for electrical machines having adjacent turns separated by insulating, heat-resisting material and a sheath of heat-resisting, insulating material therefor and an inclosing metal shell having sealed joints.

6. A field-magnet coil for electrical machines comprising a plurality of separately-insulated parts and a hermetically-sealed metal shell in which said coil is inclosed.

7. A coil for electrical machines comprising a plurality of parts, insulating, heat-resisting material separating and surrounding said parts and a hermetically-sealed metal shell for said coil having a two-part terminal-box at one end.

8. A coil for electrical machines comprising a plurality of parts, insulating, heat-resisting material separating and surrounding said parts and a hermetically-sealed metal shell for said coil having a terminal-box at one end the cover of which has a removable dovetail connection with the body portion.

In testimony whereof I have hereunto subscribed my name this 11th day of June, 1903.

LOYALL A. OSBORNE.

Witnesses:
A. W. MONTGOMERY,
BIRNEY HINES.